United States Patent
Sudau

[11] Patent Number: 5,944,610
[45] Date of Patent: Aug. 31, 1999

[54] TWO-MASS FLYWHEEL FOR A MOTOR VEHICLE, WHICH TWO-MASS FLYWHEEL HAS AN OPENING TO RECEIVE LUBRICANT

[75] Inventor: Jörg Sudau, Niederwerrn, Germany

[73] Assignee: Fichtel & Sachs AG, Schweinfurt, Germany

[21] Appl. No.: 08/822,249

[22] Filed: Mar. 20, 1997

[30] Foreign Application Priority Data

Mar. 21, 1996 [DE] Germany .......................... 196 11 184

[51] Int. Cl.⁶ ...................................................... F16D 3/14
[52] U.S. Cl. .......................... 464/24; 464/68; 192/55.61; 192/212
[58] Field of Search ................................. 464/24, 66, 68; 192/113.5, 70.17, 55.61, 212; 74/574; 475/347, 346

[56] References Cited

U.S. PATENT DOCUMENTS

| | | | |
|---|---|---|---|
| 4,727,767 | 3/1988 | Aiki et al. .................................. | 464/68 |
| 4,788,884 | 12/1988 | Reik et al. ................................. | 464/68 |
| 4,874,350 | 10/1989 | Casse et al. ............................... | 464/68 |
| 5,273,372 | 12/1993 | Friedmann et al. ....................... | 464/24 |
| 5,293,977 | 3/1994 | Friedmann ................................. | 464/68 |
| 5,349,883 | 9/1994 | Reik et al. ................................. | 74/574 |
| 5,471,896 | 12/1995 | Schierling et al. ........................ | 464/68 |
| 5,601,492 | 2/1997 | Schierling et al. ........................ | 464/68 |
| 5,669,478 | 9/1997 | Schierling et al. ........................ | 74/574 |

FOREIGN PATENT DOCUMENTS

| | | |
|---|---|---|
| 3628774 | 4/1987 | Germany . |
| 3630398 | 5/1987 | Germany . |

Primary Examiner—Eileen Dunn Lillis
Attorney, Agent, or Firm—Nils H. Ljungman & Associates

[57] ABSTRACT

A torsional vibration damper for a flywheel with two inertial masses has two rotating elements which can rotate together and relative to one another. The rotating elements are connected to one another with rotational elasticity by a spring. The spring is located in a channel which is formed on the outside periphery of one of the two rotating elements. The channel is filled at least partly with lubricant. A filling passage for the lubricant is contained in one of the two rotating elements in the vicinity of the hub. The filling passage is closed by the annular surface of a component which, at least in the operationally fully assembled condition, is in contact with one of the two rotating elements and/or the hub. It is thereby possible to eliminate a separate closing cap, along with the corresponding work step which is necessary for the installation of such a closing cap.

18 Claims, 3 Drawing Sheets

TWO-MASS FLYWHEEL FOR A MOTOR VEHICLE, WHICH TWO-MASS FLYWHEEL HAS AN OPENING TO RECEIVE LUBRICANT

BACKGROUND OF THE INVENTION

1. Field of the Invention

The present invention relates generally to a torsional vibration damper, in particular for a flywheel which has two inertial masses, and is installed in the drive train of a motor vehicle.

2. Background Information

German Patent No. 36 28 774 A1 discloses a torsional vibration damper which has two rotating elements which can rotate around a joint axis of rotation both together and relative to one another. One of the two rotating elements has a ring-shaped hub which is located centrally in relation to the axis of rotation. The other of the two rotating elements is rotationally guided on the hub by means of a pivot bearing. A first of the two rotating elements, in the vicinity of its outside periphery, also has a channel which is tightly sealed toward the radial outside. In the channel a coupling part, which is rotationally connected to the second of the two rotating elements, extends or projects radially. Further, at least one spring is located in the channel, which spring connects the first rotating element with rotational elasticity to the coupling part.

To fill the channel with lubricant, in particular grease, to reduce wear and to damp noise and vibrations, an opening is provided in one of the two rotation elements, radially outside the hub area. The opening, after the channel has been filled with lubricant, must be closed by means of a special cap. The preparation and installation of the cap requires some effort.

OBJECT OF THE INVENTION

The object of the present invention is to improve a rotational vibration damper of the type described above so that the closure of the opening is simplified, and preferably does not require an additional component.

SUMMARY OF THE INVENTION

The present invention teaches that this object can be accomplished in accordance with at least one preferred embodiment, by an arrangement in which one of the two rotating elements, in the vicinity of the hub and/or in the hub, has at least one filling passage which is open toward the channel, for the introduction of the lubricant, in particular grease, into the channel. The filling passage is preferably closed by an annular or ring-shaped surface of a component which, in the operationally ready, fully assembled condition, is in contact with one of the two rotating elements and/or with the hub.

It is thereby possible to close the filling passage by using components which are used for other purposes during the assembly of the torsional vibration damper, and which are therefore necessary in any case, or on a shaft, such as the crankshaft, the rotational movements of which are to be damped, to close the filling passage during the installation of the partly or fully assembled torsional vibration damper by means of the shaft itself. It is not necessary to use a separate closing cap. As a result of the location of the filling passages in the hub area of the torsional vibration damper, the sealing surfaces which close the filling passage are subjected to low centrifugal forces, so that the requirements for the seal of the filling passage are not as stringent as those specified in German Patent No. 36 28 774 A1, in which the filling passage is located radially outside the hub.

In other words, the filling passage can be closed during assembly, by using components that have other functions during regular operation of a two-mass flywheel. A shaft, such as the crankshaft, could be used to seal the filling passages when the two-mass flywheel is connected to the crankshaft.

The filling passage preferably proceeds in the filling direction of the lubricant from a surface of one of the two rotating elements, which surface is normal to the axis, such as the surface which is already present as a rule on the hub of the one rotating element.

In other words, the filling direction of lubricant is the direction the lubricant can move in going from an insertion point on the outside of the two-mass flywheel to a final position inside the channel. The filling passage can preferably be configured to permit the lubricant to move from the insertion point to the final position inside the channel.

The annular surface which closes the filling passage can preferably belong to a shaft which can be fastened coaxially to one of the two rotating elements, in particular to the crankshaft of an internal combustion engine. As a result of this measure, the filling passage can be closed in one working process during the installation of the torsional vibration damper on the shaft. The annular surface which closes the filling passage is preferably an end surface of an end or terminal flange of the crankshaft.

Alternatively, the component which closes the filling passage can be a bearing cover which axially secures the pivot bearing on the hub. Such a bearing cover is generally necessary in any case on torsional vibration dampers of the type in question, and in this embodiment can perform the additional function of closing the filling passage. Here again, the present invention teaches that no additional work step is necessary during the assembly of the torsional vibration damper.

Alternatively, the filling passage can begin, in the direction in which the lubricant is filled, from an inside peripheral surface of the ring-shaped hub of the one rotating element, and can be closed by the outside peripheral surface of a pilot pivot bearing which can be inserted in the hub. The pilot pivot bearing guides the end of a shaft, such as the input shaft of a transmission. The shaft can be connected non-rotationally to the other rotating element by means of a friction clutch, in the hub. In this variant, too, a component which is used in any case for another purpose, namely the pilot pivot bearing, is used to close the filling passage, so that here, again, an additional work step such as the insertion of a separate closing cover is unnecessary.

The ring surface of the one of the two rotating elements, from which the filling passage starts in the direction in which the lubricant is filled, makes possible the pressure-tight application of a mouthpiece of a lubricant press or grease gun. Consequently, the only action that is necessary is to place the lubricant press on the filling passage and to actuate the press so that the lubricant, which is generally highly viscous, is pressed into the filling passage and further into the channel, without the possibility of the discharge of lubricant between the mouthpiece of the lubricant press and the surface surrounding the filling passage.

The filling passage preferably contains a deflector surface which conducts the lubricant toward the channel. This measure makes possible an easy filling of the lubricant and also ensures that the lubricant, immediately after its entry into the filling passage, is deflected in the direction in which the lubricant is ultimately intended to go, namely to the channel on the outside periphery of the rotational vibration damper.

The filling passage is preferably formed by a radial slot, in particular a milled or cut slot, which connects one end surface of the hub with the outside periphery of the hub.

In other words, the filling passage can be formed by a radial slot in the hub. The filling passage can extend from an end surface of the hub substantially perpendicular to the axis of rotation to the cylindrical outer surface of said hub. However, the filling passage may be formed in one of the two rotating elements in an area close to the hub.

Preferably, the filling passages formed in the hub are bordered on the radial outside by the inside periphery of the pivot bearing which guides the other rotating element on the hub. This embodiment of the present invention is preferred in particular when the filling passage is realized in the form of a radial slot which can be created particularly easily. The pivot bearing which is necessary in any case thereby also performs the function of acting as the radially outer limit of the filling passage, which significantly facilitates the creation and sealing of the filling passage.

Preferably, a plurality of filling passages are located around the axis of rotation, all of which filling passages can be closed jointly by the annular surface of the component which is in contact with the hub. As a result of this measure, it is possible from the very outset to achieve a somewhat uniform distribution of the lubricant. The lubricant, after it is filled, is transported out of the hub area into the channel by the centrifugal force generated by the rapid rotation of the torsional vibration damper. When a plurality of filling passages are used, the imbalances which are present are also very minor, and the uniform distribution of the lubricant in the channel automatically occurs more rapidly. The filling process is also accelerated.

The filling passages preferably empty or emerge in the filling direction into a common ring channel. Consequently, the uniform distribution of the lubricant can be ensured even in the hub area, which further accelerates the uniform distribution of the lubricant in the channel as a result of the rapid rotation of the torsional vibration damper.

The coupling part or clutch part is preferably disc-shaped and is or can be rigidly connected to the second of the two rotating elements. The filling passage empties in the filling direction of the lubricant in a gap or space between the clutch part and a disc or plate of the first of the two rotating elements. The disc is axially opposite the coupling part, so that when the lubricant is introduced, it travels through the gap into the channel.

In an additional embodiment, the clutch part is preferably connected rotationally to the second of the two rotating elements by means of a planetary gear train. The ring gear of the planetary gear train is realized on the clutch part, the sun wheel of the planetary gear train is realized on the hub, and the planet gears of the planetary gear train are rotationally mounted on the two rotating elements between two axially opposite discs or plates of the two rotating elements. As a result of this measure, the damping action of the vibration damping elements in the channel can be adapted with much greater precision or accuracy to different operating conditions, such as different load and speed conditions.

In this case, the lubricant is used not only to lubricate the torsional vibration damper, but also to lubricate the planetary gear train. To supply the planetary gear train with sufficient lubricant as soon as possible, i.e. immediately after the lubricant has been introduced, the filling passage can empty in the direction in which the lubricant is introduced on the outside periphery of the hub, axially between the pivot bearing and the sun wheel and/or the planet gears.

In other words and in accordance with one possible embodiment of the present invention, a planetary gear train may be used in the two-mass flywheel along with the torsional vibration damper. The planetary gear train can be used to adjust the damping action of the torsional vibration damper to reach a more desirable operational setting of the torsional vibration damper. The lubricant inserted into the filling passage to lubricate the torsional vibration damper can also be used to lubricate the planetary gear train. The above-described embodiment of the present invention can operate optimally when the planetary gear train receives the lubricant shortly after the lubricant is inserted into the filling passage. In order for the lubricant to reach the planetary gear train as quickly as possible, the lubricant can be discharged from the filling passage into a space between the pivot bearing and the sun gear and/or the planet gears. The lubricant, by being discharged next to the sun gear and/or the planet gears, can reach the planetary gear train almost as soon as the lubricant is inserted into the filling passage.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein.

DESCRIPTION OF THE PREFERRED EMBODIMENT

Figure 1:
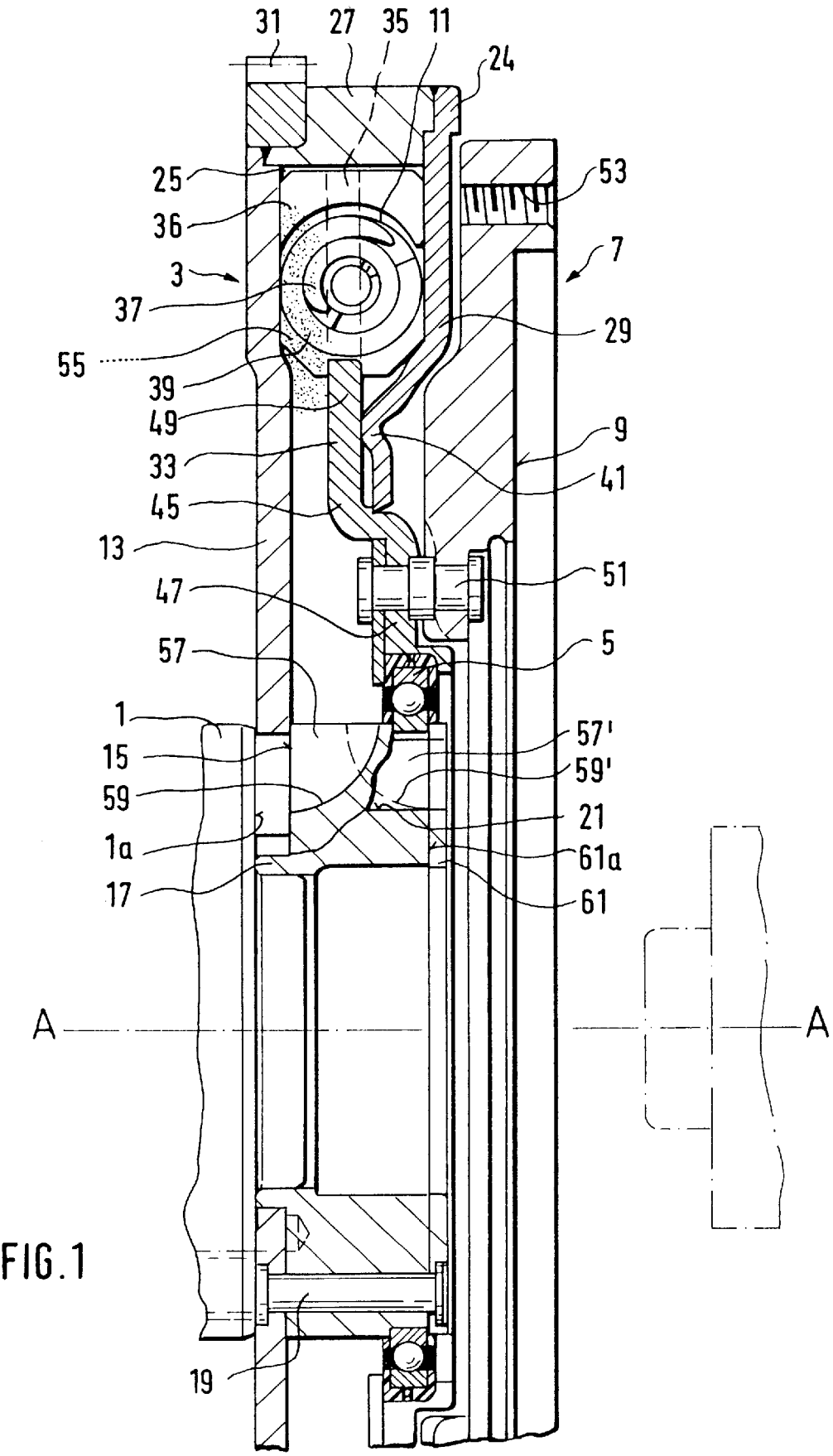
FIG. 1 shows a partial axial longitudinal section through a flywheel which has two inertial masses, with a torsional vibration damper.

FIG. 1 shows a partial axial longitudinal section through a flywheel which can have two inertial masses for installation in the drive train of an automotive or motor vehicle. The flywheel with two inertial masses preferably includes a first or primary-side rotating element or mass 3 which can be fastened to an end or terminal flange 1 of a crankshaft of an internal combustion engine. On the first rotating element or mass 3, a second or secondary-side rotating element or mass 7 can be mounted rotationally or so that the second rotating element 7 can rotate around an axis of rotation A—A common to the crankshaft and the first rotating element 3 by means of a pivot bearing 5, a sealed, enclosed or encapsulated spherical ball bearing. The second rotating element or mass 7 can be connected by means of a friction clutch (not shown) to an input shaft of a transmission which can be located downstream of the internal combustion, engine. The second rotating element 7 may form a counter application plate 9 of the friction clutch. The two rotating elements 3 and 7 are preferably coupled to one another with rotational elasticity by means of a torsional vibration damper 11.

In other words, and in accordance with one preferred embodiment of the present invention, the second rotating mass 7 can be mounted on a pivot bearing 5 to permit the second rotating mass 7 to rotate around the axis of rotation A—A. The pivot bearing 5 can preferably be attached to a portion of the first rotating mass 3. The pivot bearing 5 could be a sealed spherical ball bearing but could also be a different type of bearing.

The first rotating element 3 can include a primary disc 13 which is preferably pressed or stamped out of sheet metal. The primary disc 13 can be fastened to a crankshaft-side end surface 15 of a sleeve-shaped hub 17 by means of rivets 19. The primary disc 13 can be formed in one piece with the hub 17. The primary disc 13 is preferably in contact on the crankshaft side with an annular surface la which is preferably normal to the axis of the end flange 1 of the crankshaft. The primary disc 13 can be fastened to this end flange 1 by means of a plurality of threaded bolts (not shown) which penetrate axial borings 21 common to the hub 17 and the primary disc 13.

In the vicinity of the outside circumference of primary disc 13 on the side farther from the crankshaft, the primary disc 13 preferably carries a ring-shaped channel 25, which ring-shaped channel 25 may be tightly sealed on the radial outside. The channel 25 can be bordered on the crankshaft side by the primary disc 13, radially by a ring-shaped mass 27, and farther from the crankshaft by a ring-shaped disc 29, which ring-shaped disc 29 is essentially parallel to the primary disc 13. The two discs 13, 29 and the ring-shaped mass 27 are welded to one another. The ring-shaped mass 27 carries a starter rim 31 in a crankshaft-side ring-shaped recess.

The second rotating element 7 can include a ring-shaped secondary disc 33 which sits with its inside periphery axially and radially fastened to the outside periphery of the pivot bearing 5, and projects with its outside periphery radially into the channel 25. From the outside periphery of the secondary disc 33, a plurality of arms 35, at intervals in the peripheral direction, can project radially into the channel 25. From the primary disc 13 and from the ring-shaped disc 29, support projections (not shown) may project axially into the channel 25, in the rest position of the torsional vibration damper 11, axially on both sides of the arms 35. Between arms 35 and support projections which are next to one another in the peripheral direction, coil springs 37, 39 can be clamped or held inside one another by means of guide shoes or sliding blocks 36.

In other words and in one embodiment of the present invention, when the torsional vibration damper 11 is in an inactive or rest position, support projections can project axially into the channel 25. The support projections can be arranged or oriented to extend on both sides of the arms 35. The arms 35 can be spaced apart at intervals from one another and can extend radially from the secondary disc 33 into the channel 25.

The ring-shaped disc 29 may be stepped or graduated radially inside the channel 25 toward the secondary disc 33 and can have a molded-on ring-shaped rib 41, which forms a dynamic seal with the secondary disc 33. A radial inner edge of the ring-shaped disc 29, together with an axially-directed step 45 of the secondary disc 33, preferably forms a second dynamic seal. The step 45 can connect an inner part 47 of the secondary disc 33, which inner part 47 sits on the bearing 5, with an outer part or coupling part 49 which is offset toward the crankshaft and projects into the channel 25. On the side farther from the crankshaft, the inner part 47 of the secondary disc 33 is preferably fastened by means of rivets 51 to the counter application plate 9 of the friction clutch (not shown). The counter application plate 9, in its outside periphery, can have bolt holes 53 for fastening a pressure plate unit of the friction clutch.

In other words and in accordance with one embodiment of the present invention, the secondary disc 33 can include an inner part 47 and a coupling part 49 joined together by a step 45. The inner part 47 of the secondary disc 33 can be positioned near the bearing 5. The coupling part 49 can extend into the channel 25 and is axially offset, towards the crankshaft, from the inner part 47. The inner part 47 can be fastened to the counter application plate 9 of the second mass or rotating element by rivets, bolts or any connecting member 51.

In another embodiment of the present invention, the ring-shaped disc 29 can have a shoulder or projection 24. The shoulder 24 is preferably located on the radial outer edge of the ring-shaped disc 29. The shoulder 24 could be used to form a connection with the ring-shaped mass 27. However, the shoulder 24 could also be possibly used to axially cover or protect the counter application plate 9 on the radial outside.

To damp noises and to reduce wear, the channel 25 should preferably be filled at least in part with highly-viscous, high-temperature lubricating grease 55. The hub 17 can have a plurality of filling passages 57 distributed in the peripheral direction. The filling passages 57 may start from the end surface 15 of the hub 17 facing the crankshaft, or from the primary disc 13 in front of the hub 17. The lubricating grease 55 can be introduced at the point before the installation of the flywheel with two inertial masses on the crankshaft. The lubricating grease 55 is preferably transported over a deflector surface 59 radially out of the hub 17 into the gap between the primary disc 13 and the secondary disc 33. The filling passages 57 can be slots which slots are preferably cut radially into the hub 17, whereby the deflector surface 59 as shown in FIG. 1 follows the shape of the outside surface of a cylinder. The filling passages 57 can have linear deflector surfaces formed by the movement of the milling cutter used to form the radial slot along a straight line at an angle to the axis of rotation A—A.

In one embodiment of the present invention, the filling passages 57 and the deflector surface 59 could be cast into the hub 17. The filling passages 57 and the deflector surface 59 could also be formed in the hub 17 by boring or any other comparable method of manufacturing.

During the installation of the flywheel which has two inertial masses on the crankshaft, the ring-shaped surface la of the end flange 1 of the crankshaft preferably closes the filling passages 57. As a result of the rapid rotation of the flywheel with two inertial masses before the installation on the crankshaft, the lubricating grease 55 can be distributed by centrifugal force in the channel 25. The flywheel with two inertial masses can then be balanced. The axial ring-shaped surface of the primary disc 13 which surrounds the filling passages 57 can be smoothed, so that during the filling process it forms a high-pressure sealing surface for the application of a grease press or gun which is centered on the hub 17. The grease press can have a ring-shaped mouthpiece for the simultaneous introduction of grease through all the filling passages 57.

Alternatively, the filling passages 57' (indicated by broken lines) can also begin from the side of the hub 17 which is farther from the crankshaft. The deflector surface of the filling passage 57' is indicated as 59'. After the grease 55 has been introduced, the filling passages 57' can be closed jointly by a ring-shaped surface 61*a* normal to the axis of a disc-shaped bearing cover 61. The bearing cover 61 can axially fasten the pivot bearing 5 to the hub 17.

The filling passages 57 can be offset in the peripheral direction between the axial borings 21 of the hub 17 for threaded bolts. The threaded bolts can be used to fasten the flywheel with two inertial masses to the end flange 1 of the crankshaft.

Figure 2:
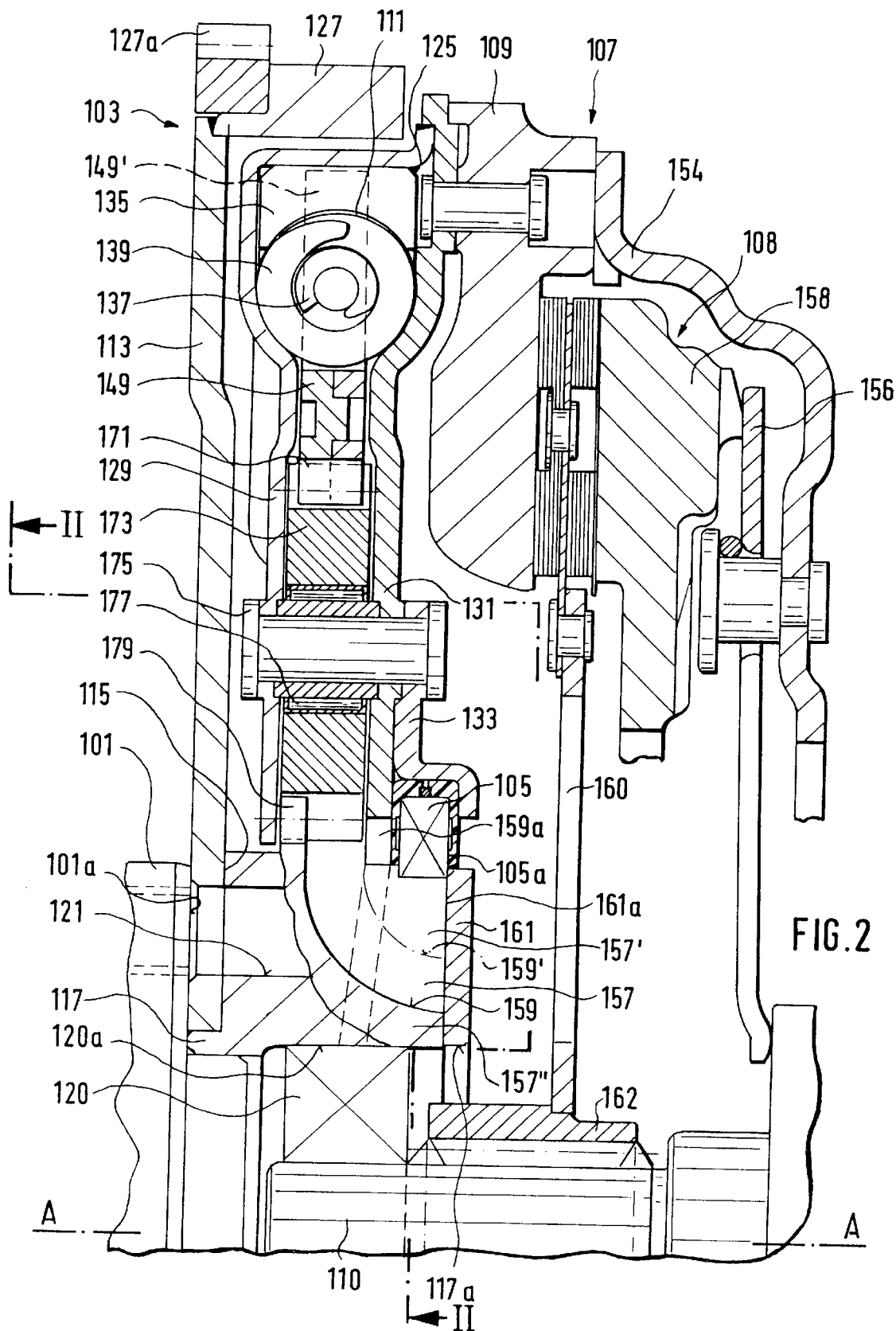
FIG. 2 shows a partial axial longitudinal section through a flywheel which has two inertial masses, with a torsional vibration damper.

FIG. 2 is a partial axial longitudinal section which shows a flywheel with two inertial masses in a second embodiment. The flywheel with two inertial masses can include a first primary rotating element or mass 103 which can be fastened to an end flange 101 of a crankshaft of an internal combustion engine. A second, secondary-side rotating element or mass 107 can be rotationally mounted so that the second rotating element 107 can rotate around the common axis of rotation A—A of the crankshaft and of the primary rotating element 103 by means of a pivot bearing 105. The secondary or secondary-side rotating element 107 can be connected by means of a friction clutch 108 with an input shaft 110 of a transmission which is located downstream of the internal combustion engine. The secondary rotating element 107 can include a counter application plate 109 of the friction clutch 108. The two rotating elements 103, 107 can be connected to one another with rotational elasticity by means of a rotational vibration damper 111.

The first rotating element 103 can include a primary disc 113 which can be pressed or stamped out of sheet metal and is preferably fixed to a crankshaft-side end surface 115 of a sleeve-shaped hub 117 by means of rivets. The primary disc 113 can, in accordance with one embodiment, be formed in one piece with the hub 117. The primary disc 113 on the crankshaft side is in contact with an annular surface 115 normal to the axis and with an annular surface 101*a* normal to the axis of the end flange 101 of the crankshaft. The primary disc 113 can be fastened to the end flange 101 by means of a plurality of threaded bolts which extend through axial borings 121 in the hub 117 and the primary disc 113. The primary disc 113, on its outside periphery, can have a welded-on ring-shaped mass 127 which faces the hub side, and a starter rim 127*a* which is preferably welded to the ring-shaped mass 127.

In other words, the primary disc 113 can be placed into contact with an annular end surface 115 of the hub 117. The end surface 115 of the hub 117 is preferably perpendicular to the axis of rotation A—A. The primary disc 113 can also be placed into contact with an annular surface 101*a* of the end flange 101 of the crankshaft. The annular surface 101*a* of the end flange 101 is preferably perpendicular to the axis of rotation A—A. The primary disc 113 can be attached to the end flange 101 by bolts or other connecting members which bolts extend through axial borings 121 in the hub 117 and the primary disc 113.

The secondary rotating element 107 can have two secondary discs, a first and second secondary disc 129 and 131 respectively, which secondary discs 129, 131 can be fastened to one another with some axial distance between them. The first secondary disc 129 can be opposite and at some distance from the primary disc 113. The second secondary disc 131 can be fastened to the outside periphery of the bearing 105 so that the second secondary disc 131 overlaps the pivot bearing 105 externally or on the outside between the second secondary disc 131 and a retaining ring 133 which is fastened to the side of the second secondary disc 131 farther from the crankshaft.

In other words and in accordance with one embodiment of the present invention, the secondary rotating element can have a first secondary disc 129 and a second secondary disc 131. The first secondary disc 129 and the second secondary disc 131 are preferably connected together but can be positioned apart from each other by a substantial axial distance. The first secondary disc 129 can be positioned closer to the primary disc 113 than the second secondary disc 131. The second secondary disc 131 can be attached to the bearing 105 to overlap the bearing 105 on the crankshaft-side of the bearing 105. A retaining ring 133 can be operatively attached to the second secondary disc 131. The retaining ring 133 can extend to overlap the bearing 105 on the side of the bearing 105 that is farther from the crankshaft. The bearing 105 is then preferably positioned between the retaining ring 133 and the second secondary disc 131.

The first and second secondary discs 129, 131 are preferably welded tightly to one another to form a ring-shaped channel 125 radially inside the ring-shaped mass 127. The channel 125 can become wider in the axial direction. A plurality of arms 149', distributed at intervals in the peripheral direction, can project from the outside periphery of a ring-shaped coupling piece 149. The ring-shaped coupling piece 149 is preferably guided between the first and second secondary discs 129, 131 so that the coupling piece 149 can rotate around the axis A—A. From the first and second secondary discs 129, 131 in the rest position of the torsional vibration damper, support projections (not shown) project into the channel 125 axially on both sides of the arms 149'. Between neighboring arms 149' and support projections, coil springs 137, 139 can be braced or held inside one another by means of sliding shoes 135.

The ring-shaped coupling part 149 is preferably engaged by means of a planetary gear train with the hub 117 and the secondary discs 129, 131. On the radial inside of the coupling part 149, which coupling part 149 is preferably guided between the two secondary discs 129, 131 so that the coupling part 149 can rotate around the axis A—A, there is a ring gear toothing 171 of the planetary gear train. Between the two secondary discs 129, 131 there can be a plurality of planet wheels 173 which can be mounted rotationally by means of simple or needle bearings 177 on corresponding rivet bolts or shanks 175. The rivet bolts 175 can extend through both of the secondary discs 129, 131 as well as the retaining ring 133 of the bearing 105, and are guided in the axial direction between the two secondary discs 129, 131. The planet wheels 173 may be engaged with the ring gear toothing 171. A sun wheel toothing 179 can be formed on the outside periphery of the hub 117. The coupling of the torsional vibration damper 111 by means of the planetary gear train makes possible an accurate adjustment of the damping characteristics to the torsional vibrations generated by the internal combustion engine under various load and speed conditions.

On the outside periphery of the second secondary disc 131, on the side farther from the channel 125, there can be a counter application plate 109 for the friction clutch 108, which counter application plate 109 preferably forms an inertial mass. A pressure plate unit can be detachably fastened by means of screws to the side of the counter application plate 109 farther from the secondary disc 131. The pressure plate unit, by means of a spring plate 156 and a pressure plate 158, can press a clutch friction disc 160 in the axial direction against the counter application plate 109. The input shaft 110 of the connected transmission can be inserted in a hub sleeve 162 of the clutch friction disc 160, which hub sleeve 162 can have internal longitudinal toothing.

In one embodiment of the present invention, a housing or cover plate 154 could be used to surround and protect the pressure plate unit. The housing 154 could possibly be attached to the spring plate 156 and extend axially toward the counter application plate 109.

To damp noises and vibrations and to reduce wear, the channel 125 should be filled at least partly with high-viscosity, high-temperature lubricating grease. For this purpose, the hub 117 can contain, distributed in the peripheral direction, a plurality of filling passages 157 which start from the end surface of the hub 117 farther from the crankshaft. The filling passages 157 can transport the lubricating grease which is introduced from this end surface over a deflector surface 159 radially out of the hub 117 into the sun wheel toothing 179 and into a ring-shaped channel 159a between the pivot bearing 105 and the sun wheel toothing 179. From the ring-shaped channel 159a, the lubricating grease can travel in the peripheral direction between neighboring planetary gear wheels 173 radially outward to the ring gear 171 on the coupling part 149. The lubricating grease can then travel through the gaps between the coupling part 149 and the first and second secondary discs 129, 131 opposite one another into the channel 125.

Figure 3:
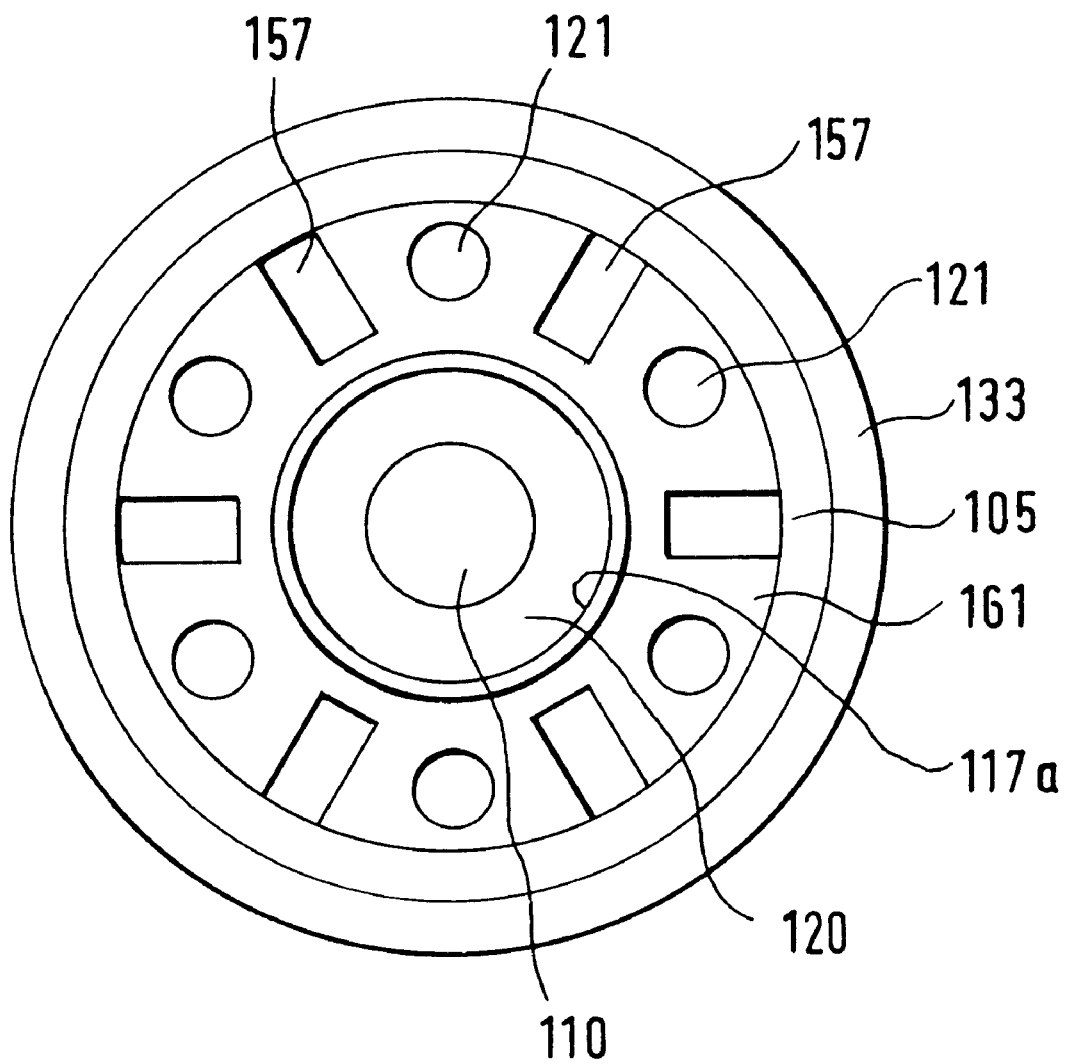
FIG. 3 is a schematic illustration in the axial direction of the hub, without a bearing cover, in the direction of the arrow (Roman numeral 21) in FIG. 2.

The filling passages 157 can be slots which have been milled radially into the hub 117, in which case the deflector surface 159 essentially follows the shape of a cylindrical surface. But, it is also possible to guide the milling cutter used to cut this radial slot at an angle to the axis A—A, so that the deflector surface 159 is linear. The filling passages 157 can be bordered on the radial outside by the inside of the pivot bearing 105. After the introduction of the lubricating grease, during the assembly of the flywheel with two inertial masses, the filling passages 157 can all be closed by a ring-shaped surface 161a of a ring-shaped bearing cover 161. The bearing cover 161 can axially fix the pivot bearing 105 to the hub 117. As a result of the centrifugal force generated during the rapid rotation of the flywheel with two inertial masses which is filled with lubricant, the lubricating grease can travel out of the vicinity of the filling passages 157 into the channel 125. The filling passages 157 can be offset in the peripheral direction between the axial borings 121 of the hub 117, as illustrated in FIG. 3.

The end surface of the hub 117, i.e. the end surface farther from the crankshaft, can surround the filler passages 157, and the portion of the pivot bearing 105 adjacent to it. A rubber coating 105a which axially seals the pivot bearing 105, can form a pressure-tight sealing surface during the filling process, for the application of a ring-shaped mouthpiece, centered on the hub 117, of a grease press.

Alternatively, as illustrated in the dot-dash lines in FIG. 2, the filling passage 157' can be realized so that it is axially shorter, so that its deflector surface 159' extends only into the ring-shaped channel 159a and not directly into the sun wheel toothing 179 of the hub 117.

Alternatively, as illustrated in dashed lines in FIG. 2, at least one filling passage 157" can begin from a ring-shaped surface 117a on the inside periphery of the hollow hub 117, and end in the ring-shaped channel 159a and/or the sun wheel gear toothing 179. After filling, the filling passage 157" can be closed by the ring-shaped outside peripheral surface 120a of a pilot pivot bearing 120. The pilot pivot bearing 120, after the assembly of the transmission, can guide the end of the transmission input shaft 110 in the hub 117. It goes without saying that at least one such filling passage 157", beginning from the inside peripheral surface of the hub can also be provided, instead of the filling passages 57 and 57' in the embodiment illustrated in FIG. 1.

One feature of the invention resides broadly in the torsional vibration damper, in particular for a flywheel with two inertial masses, to be installed in the drive train of an automotive vehicle, with two rotating elements 3, 7, 103, 107 which can rotate around a common axis of rotation A—A both together and also relative to one another. One 3, 103 of the two rotating elements has a hub, in particular a ring-shaped hub 17, 117, which is centered on the axis of rotation A—A, and the other 7, 107 of the two rotating elements is guided rotationally by means of a pivot bearing 5, 105 on the hub 17, 117, and of which two rotating elements a first 3, 107 rotating element has, in the vicinity of its outside periphery, a channel 25, 125 which is tightly sealed toward the radial outside. Into the channel a coupling part 49, 149 which is rotationally connected to a second 7, 103 of the two rotating elements extends or projects radially, and with at least one spring 37, 39, 137, 139 located in the channel 25, 125, which spring connects the first element 3, 107 with rotational elasticity to the coupling part 49, 149, characterized by the fact that in the one 3, 103 of the two rotating elements, in the vicinity of the hub 17, 117 and/or in the hub 17, 117, there is at least one filling passage 57, 57', 157, 157', 157" which is open toward the channel 25, 125 for lubricant 55 to be introduced into the channel 25, 125, whereby the filling passage is closed by an annular surface 1a, 61a, 101a, 161a, 120a of a component 1, 61, 101, 161, 120 which, at least in the operationally ready and fully assembled condition, is in contact with one of the two rotating elements 3, 103 and/or the hub 17, 117.

Another feature of the invention resides broadly in the torsional vibration damper characterized by the fact that the filling passage 57, 57', 157, 157' begins, in the filling direction of the lubricant, from a surface of one of the two rotating elements 3, 103, which surface is normal to the axis.

Yet another feature of the invention resides broadly in the torsional vibration damper characterized by the fact that the annular surface 1a which closes the filling passage 57 belongs to a shaft which can be fastened coaxially to one of the two rotating elements 3, in particular the crankshaft of an internal combustion engine.

Still another feature of the invention resides broadly in the torsional vibration damper characterized by the fact that the annular surface 1a which closes the filling passage 57 is an end surface of an end or terminal flange 1 of the crankshaft.

A further feature of the invention resides broadly in the torsional vibration damper characterized by the fact that the component which closes the filling passage 57', 157, 157' is a bearing cover 61, 161 which secures the pivot bearing 5, 105 to the hub 17, 117.

Another feature of the invention resides broadly in the torsional vibration damper characterized by the fact that the filling passage 157", in the direction in which the lubricant is introduced, begins from an inside peripheral surface 117a of the ring-shaped hub 117 of the one rotating element 103, and can be closed by the outside peripheral surface 120a of a pilot pivot bearing 120 which can be inserted in the hub 117, which pilot pivot bearing 120 guides the end of a shaft 110 in the hub 117, whereby the shaft 110 can be non-rotationally connected by means of a friction clutch 108.

Yet another feature of the invention resides broadly in the torsional vibration damper characterized by the fact that the annular surface of the one of the two rotating elements 3, 103 from which the filling passage 57, 157 proceeds, in the direction in which the lubricant is introduced, makes possible the pressure-tight or sealed application of a mouthpiece of a lubricant press.

Still another feature of the invention resides broadly in the torsional vibration damper characterized by the fact that the filling passage 57, 57', 157, 157' contains a deflector surface 59, 59', 159, 159' which guides the lubricant toward the channel 25, 125.

A further feature of the invention resides broadly in the torsional vibration damper characterized by the fact that the filling passage 57, 57', 157, 157' is formed by a radial slot, in particular a milled or cut slot, which connects the end surface of the hub with the outside periphery of the hub.

Another feature of the invention resides broadly in the torsional vibration damper characterized by the fact that the filling passage 57, 57', 157, 157' is bordered radially outward by the inside periphery of the pivot bearing 5, 105 which guides the other rotating element 7, 107 on the hub 17, 117.

Yet another feature of the invention resides broadly in the torsional vibration damper characterized by the fact that there are a plurality of filling passages 57, 57', 157, 157', 157" distributed around the axis of rotation A—A, which filling passages can all be closed at the same time or jointly by the annular surface 1a, 61a, 101a, 161a, 120a of the component 1, 61, 101, 161, 120 which is in contact with the hub.

Still another feature of the invention resides broadly in the torsional vibration damper characterized by the fact that the filling passages 157, 157', 157", in the direction in which the lubricant is introduced, empty into a common ring channel 159a.

A further feature of the invention resides broadly in the torsional vibration damper characterized by the fact that the coupling part 49 is in the form of a disc, and is or can be rigidly connected to the second 7 of the two rotating elements, The filling passage 57, in the direction in which the lubricant is filled, empties into a space which is located axially between the coupling part 49 and a disc 13 of the first 3 of the two rotating elements, which disc 13 is axially opposite the coupling part 49, and the lubricant, when filled, travels through the space into the channel 25.

Another feature of the invention resides broadly in the torsional vibration damper characterized by the fact that the coupling part 149 is rotationally connected to the second 107 of the two rotating elements by means of a planetary gear train 171, 173, 179, whereby the ring gear 171 of the planetary gear train is realized on the coupling part 149, the sun wheel 179 of the planetary gear train is realized on the hub 117, and the planetary gears 173 are mounted on discs 129, 131 so that they can rotate between two axially opposite discs 129, 131 of the second 107 of the two rotating elements.

Yet another feature of the invention resides broadly in the torsional vibration damper characterized by the fact that the filling passage 157, 157', 157" empties, ends or emerges, in the direction in which the lubricant is introduced, on the outside periphery of the hub 117 axially between the pivot bearing 105 and the sun wheel 179 and/or the planet wheels 173.

Still another feature of the invention resides broadly in the torsional vibration damper characterized by the fact that the filling passage 157, in the direction in which the lubricant is introduced, ends or emerges at least partly in the gear toothing of the sun wheel 179.

A further feature of the invention resides broadly in the torsional vibration damper characterized by the fact that the lubricant which is discharged from the filling passage 157, 157', 157" travels in the peripheral direction between neighboring planet wheels 179 to the ring gear 171 and further into the channel 125.

Another feature of the invention resides broadly in the torsional vibration damper characterized by the fact that a friction device 49, 149 which is active between the two rotating elements is located in the channel 25, 125.

Yet another feature of the invention resides broadly in the torsional vibration damper characterized by the fact that the first rotating element 3, 103 which has the hub 17, 117 can be fastened as the primary-side rotating element by means of threaded bolts to a crankshaft 1, 101 of an internal combustion engine. The second rotating element 7, 107 can be connected by means of a friction clutch 108 to the input shaft 110 of the transmission in the drive train of the motor vehicle.

Still another feature of the invention resides broadly in the rotary vibration damper, especially for a dual-mass flywheel, for placing in the drive of an automobile, with two rotary elements (3, 7, 103, 107) which are rotatable together as well as relative to each other, around a joint axis of rotation (A—A). One (3, 103) of these two rotary elements shows, centrically to the axis of rotation (A—A), a particularly ring-shaped hub (17, 117) and the other (7, 107) rotary element of the two is, by means of a rotary bearing (5, 105), guided on the hub (17, 117) in a rotatable manner. Furthermore, the first (3, 107) of the two rotary elements shows, in the area of its outer circumference, a channel (25, 125) which is tightly closed in a radially outward manner, into which channel a part of the clutch (49, 149) extends radially, which part of the clutch has a rotary connection to the second (7, 103) of the two rotary elements and with at least one spring (37, 39, 137, 139) placed in the channel (25, 125) which spring connects the first rotary element (3, 107) to the part of the clutch (49, 149) in a torsionally elastic manner. Whereby in one (3, 103) of the two rotary elements at least one feeder passageway (57, 57', 157, 157', 157") is placed, which is opened toward the channel (25, 125), for lubricants (55) that have to be fed into the channel (25, 125), especially grease, distinguished in that the feeder passageway (57, 57', 157, 157', 157") is located in the hub (17, 117) and that the feeder passageway is closed by a ring area (1a, 61a, 101a, 161a, 120a) on the component (1, 61, 101, 161, 120) that lies against the hub (17, 117), against which the rotary vibration damper, only in a ready-for-operation state, mounted in the drive, lies flat, or/and that the rotary bearing (5, 105) secures the rotary vibration damper, which is otherwise for the installation in the drive, in an essentially mounted and ready-for-operation state, on the hub (17, 117).

Examples of planetary gear mechanisms, components thereof, and components associated therewith, which may possibly be utilized or adapted for use in the context of the present invention may be disclosed in the following patents: U.S. Pat. No. 5,370,590, entitled "Securing Means for a Planetary Gear Unit"; and U.S. Pat. No. 5,342,258, entitled "Combinational Incrementally Variable Transmissions and Other Gearing Arrangements Allowing Maximum Kinematic Degrees of Freedom"; U.S. Pat. No. 5,292,290, entitled "Transmission Arrangement for Vehicles"; U.S. Pat. No. 5,279,527, entitled "Shiftless, Continuously-aligning Transmission"; U.S. Pat. No. 5,222,923, entitled "Planetary Gear Transmission"; and U.S. Pat. No. 5,194,055, entitled "Planetary Gear Type Transmission Mechanism".

Examples of clutches, and components associated therewith, which may possibly be utilized or adapted for use in the context of the present invention may be disclosed in the following U.S. Pat. Nos.: 5,000,304; 4,941,558; 4,854,438; 4,741,423; and 4,715,485.

Examples of torsional vibration dampers, and components associated therewith, which may possibly be utilized or adapted for use in the context of the present invention may be disclosed in the following U.S. Pat. Nos.: 5,016,744; 4,890,712; 4,697,682; 4,684,007; 4,651,857; and 4,433,771.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A fully-assembled two-mass flywheel for use in a drive train of a motor vehicle, said fully-assembled two-mass flywheel comprising:
   a first mass;
   said first mass being configured and disposed on said two-mass flywheel to connect to a crankshaft of a motor vehicle;
   a second mass;
   said second mass being configured and disposed on said two-mass flywheel to connect to a clutch of a motor vehicle;
   said first mass and said second mass being connected to rotate together and relative to one another about a common axis of rotation;
   said first mass comprising a hub;
   said hub being disposed about the axis of rotation;
   said hub, comprising a portion of said first mass, being configured and disposed to receive a crankshaft of a motor vehicle;
   at least one of said first mass and said second mass being configured to form a hollow space between said first mass and said second mass;
   at least one passageway;
   at least a portion of said at least one passageway being disposed within one of said first mass and said second mass;
   said at least one passageway being configured and disposed to permit lubricant to move through said at least one passageway into said hollow space;
   said at least one passageway comprising an orifice structure;
   said orifice structure being disposed on said hub;
   said orifice structure being configured and disposed to receive lubricant;
   said orifice structure being open and unsealed upon full assembly of said two-mass flywheel;
   said orifice structure of said at least one passageway being configured to contact an already existing component of a drive train, said component comprising one of the following a), b) and c):
      a) a portion of a crankshaft to be disposed to transmit torque between a crankshaft and said two-mass flywheel;
      b) a plate to be disposed to operatively connect said hub to a bearing arrangement; and
      c) a bearing structure to be disposed to guide said two-mass flywheel on a shaft of a transmission; and
   said orifice structure being configured and disposed to be sealed by one of a), b) and c) to minimize leakage of lubricant from said two-mass flywheel subsequent to installation of said fully assembled two-mass flywheel into a drive train of a motor vehicle.

2. The two-mass flywheel according to claim 1, further comprising:
   a torsional vibration damper; and
   said torsional vibration damper comprising:
      at least one spring;
      said at least one spring being disposed within said hollow space; and
      said at least one spring being configured and disposed to connect said first mass and said second mass with rotational elasticity.

3. The two-mass flywheel according to claim 2, wherein:
   said torsional vibration damper comprises a coupling member;
   at least a portion of said coupling member is disposed in said hollow space;
   said coupling member is operatively connected to said second mass;
   said at least one spring is configured and disposed to connect said first mass and said coupling member with rotational elasticity;
   a hub bearing arrangement is disposed on said hub;
   said hub bearing arrangement is configured and disposed to guide said second mass about the axis of rotation;
   said hub is substantially ring-shaped; and
   said at least one passageway is at least one of d) and e):
      d) disposed adjacent to said hub; and
      e) disposed within said hub.

4. The two-mass flywheel according to claim 3, wherein:
   one of said first mass and said second mass comprises a surface;
   said surface of said one of said first mass and said second mass is disposed substantially perpendicular to the axis of rotation; and
   said orifice structure is disposed on said perpendicular surface of said one of said first mass and said second mass.

5. The two-mass flywheel according to claim 4, wherein:
   said first mass comprises said perpendicular surface;
   said at least one passageway comprises a plurality of passageways;
   said plurality of passageways are disposed about the axis of rotation;
   said hub is configured and disposed to contact said portion of a crankshaft;

said orifice structure of each of said plurality of passageways are configured and disposed to be simultaneously sealed by said portion of a crankshaft;

said perpendicular surface of said first mass is configured to permit a mouthpiece of a lubricant press to form a pressure-tight seal on said perpendicular surface of said first mass;

said hub comprises an inner surface and an outer surface;

said inner surface of said hub is disposed a first radial distance from the axis of rotation;

said outer surface of said hub is disposed a second radial distance from the axis of rotation;

the second radial distance is substantially greater than the first radial distance;

said hub comprises an end surface;

said end surface of said hub is disposed substantially perpendicular to the axis of rotation between said inner surface of said hub and said outer surface of said hub;

said end surface of said hub comprises at least a portion of said perpendicular surface of said first mass;

each of said plurality of passageways comprises a radial slot;

said radial slot of each of said plurality of passageways is disposed to connect said outer surface of said hub and said end surface of said hub;

said radial slot of each of said plurality of passageways comprises a deflector surface;

said deflector surface of said radial slot of each of said plurality of passageways is configured and disposed to direct lubricant towards said hollow space; and said bearing arrangement is disposed radially outside of said plurality of passageways.

6. The two-mass flywheel according to claim wherein:

said two-mass flywheel comprises one of f) and g):

f) said first mass is configured to form said hollow space between said first mass and said second mass;

said coupling member comprises a first disc;

said first disc is disposed substantially perpendicular to the axis of rotation;

said first disc is rigidly connected to said second mass;

said first mass comprises a second disc;

said second disc is disposed substantially parallel to said first disc;

said second disc is disposed a substantial axial distance from said first disc;

said first disc and said second disc are configured and disposed to form a space for lubricant between said first disc and said second disc; and said space is configured and disposed to connect each of said plurality of passageways and said hollow space to permit lubricant to travel from each of said plurality of passageways through said space to said hollow space; and g) said second mass comprises a first disc and a second disc;

said first disc and said second disc are disposed substantially parallel to each another;

said first disc and said second disc are configured and disposed to form said hollow space;

said torsional vibration damper comprises a planetary gear train;

said planetary gear train is disposed between said first disc and said second disc;

said planetary gear train is configured and disposed to connect said coupling member to said second mass;

said planetary gear train comprises:

a ring gear;

said ring gear comprising a portion of said coupling member;

a sun gear;

said sun gear comprising a portion of said hub;

said sun gear comprising gearing;

a plurality of planet wheels;

said plurality of planet wheels being disposed between said ring gear and said sun gear;

each of said plurality of planet wheels being configured and disposed to engage with said gearing of said sun gear;

each of said plurality of planet wheels being mounted on both said first disc and said second disc; and each of said plurality of planet wheels being configured and disposed to rotate about the axis of rotation between said first disc and said second disc;

said two-mass flywheel comprises a ring channel;

said ring channel is disposed adjacent to said bearing arrangement;

each of said plurality of passageways comprises a first end and a second end disposed opposite to said first end;

said first end of each of said plurality of passageways comprises said orifice structure;

said second end of each of said plurality of passageways is disposed at least one of h), i) and j):

h) on said outer surface of said hub between said bearing arrangement and at least one of said sun gear and said plurality of planet wheels;

i) in said gearing of said sun gear; and j) in said ring channel;

each pair of adjacent planet wheels of said plurality of planet wheels is configured and disposed to form a space for lubricant between said each pair of adjacent planet wheels; and said space is configured and disposed to connect said second end of each of said plurality of passageways and said hollow space to permit lubricant to travel from said second end of each of said plurality of passageways through said space to said hollow space;

said first mass is configured to be connected to a crankshaft of an internal combustion engine by threaded bolts; and said second mass is configured to be connected to an input shaft of a transmission by a friction clutch.

7. The two-mass flywheel according to claim 4, wherein:

said second mass comprises said perpendicular surface;

said at least one passageway comprises a plurality of passageways;

said plurality of passageways are disposed about the axis of rotation;

said hub is configured and disposed to contact said plate;

said orifice structure of each of said plurality of passageways are configured and disposed to be simultaneously sealed by said plate;

said perpendicular surface of said second mass is configured to permit a mouthpiece of a lubricant press to form a pressure-tight seal on said perpendicular surface of said second mass;

said hub comprises an inner surface and an outer surface;

said inner surface of said hub is disposed a first radial distance from the axis of rotation;

said outer surface of said hub is disposed a second radial distance from the axis of rotation;

the second radial distance is substantially greater than the first radial distance;

said hub comprises an end surface;

said end surface of said hub is disposed substantially perpendicular to the axis of rotation between said inner surface of said hub and said outer surface of said hub;

said end surface of said hub comprises at least a portion of said perpendicular surface of said second mass;

each of said plurality of passageways comprises a radial slot;

said radial slot of each of said plurality of passageways is disposed to connect said outer surface of said hub and said end surface of said hub;

said radial slot of each of said plurality of passageways comprises a deflector surface;

said deflector surface of said radial slot of each of said plurality of passageways is configured and disposed to direct lubricant towards said hollow space; and said bearing arrangement is disposed radially outside of said plurality of passageways.

8. The two-mass flywheel according to claim 7, wherein:

said two-mass flywheel comprises one of k) and l):

k) said first mass is configured to form said hollow space between said first mass and said second mass;

said coupling member comprises a first disc;

said first disc is disposed substantially perpendicular to the axis of rotation;

said first disc is rigidly connected to said second mass;

said first mass comprises a second disc;

said second disc is disposed substantially parallel to said first disc;

said second disc is disposed a substantial axial distance from said first disc;

said first disc and said second disc are configured and disposed to form a space for lubricant between said first disc and said second disc; and said space is configured and disposed to connect each of said plurality of passageways and said hollow space to permit lubricant to travel from each of said plurality of passageways through said space to said hollow space; and l) said second mass comprises a first disc and a second disc;

said first disc and said second disc are disposed substantially parallel to each another;

said first disc and said second disc are configured and disposed to form said hollow space;

said torsional vibration damper comprises a planetary gear train;

said planetary gear train is disposed between said first disc and said second disc;

said planetary gear train is configured and disposed to connect said coupling member to said second mass;

said planetary gear train comprises:

a ring gear;

said ring gear comprising a portion of said coupling member;

a sun gear;

said sun gear comprising a portion of said hub;

said sun gear comprising gearing;

a plurality of planet wheels;

each of said plurality of planet wheels being configured and disposed to engage with said gearing of said sun gear;

said plurality of planet wheels being disposed between said ring gear and said sun gear;

each of said plurality of planet wheels being mounted on both said first disc and said second disc; and each of said plurality of planet wheels being configured and disposed to rotate about the axis of rotation between said first disc and said second disc;

said two-mass flywheel comprises a ring channel;

said ring channel is disposed adjacent to said bearing arrangement;

each of said plurality of passageways comprises a first end and a second end;

said second end of each of said plurality of passageways is disposed opposite to said first end of each of said plurality of passageways;

said first end of each of said plurality of passageways comprises said orifice structure;

said second end of each of said plurality of passageways is disposed at least one of m), n) and o):

m) on said outer surface of said hub between said bearing arrangement and at least one of said sun gear and said plurality of planet wheels;

n) in said gearing of said sun gear; and o) in said ring channel;

each pair of adjacent planet wheels of said plurality of planet wheels is configured and disposed to form a space for lubricant between said each pair of adjacent planet wheels; and said space is configured and disposed to connect said second end of each of said plurality of passageways and said hollow space to permit lubricant to travel from said second end of each of said plurality of passageways through said space to said hollow space;

said first mass is configured to be connected to a crankshaft of an internal combustion engine by threaded bolts; and said second mass is configured to be connected to an input shaft of a transmission by a friction clutch.

9. The two-mass flywheel according to claim 3, wherein:

said hub comprises an inner surface and an outer surface;

said inner surface of said hub is disposed a first radial distance from the axis of rotation;

said outer surface of said hub is disposed a second radial distance from the axis of rotation;

the second radial distance is substantially greater than the first radial distance;

said orifice structure of said at least one passageway is disposed on said inner surface of said hub;

said component comprises said bearing structure to be disposed to guide said two-mass flywheel on a shaft of a transmission;

said bearing structure comprises a pivot bearing;

said pivot bearing is configured to be disposed inside said hub;

said pivot bearing comprises an outer surface;

said outer surface of said pivot bearing is configured and disposed to seal said orifice structure of said at least one passageway and to minimize leakage of lubricant from said two-mass flywheel; and said pivot bearing is configured to guide an input shaft of a transmission into said hub.

10. The two-mass flywheel according to claim 9, wherein:

said at least one passageway comprises a plurality of passageways;

said plurality of passageways are disposed about the axis of rotation;

said outer surface of said pivot bearing is configured and disposed to simultaneously seal said orifice structure of each of said plurality of passageways;

said bearing arrangement is disposed radially outward of said plurality of passageways;

said first mass is configured to be connected to a crankshaft of an internal combustion engine by threaded bolts;

said second mass is configured to be connected to an input shaft of a transmission by a friction clutch; and said two-mass flywheel comprises one of the following p) and q):

p) said first mass is configured to form said hollow space between said first mass and said second mass;
    said coupling member comprises a first disc;
    said first disc is disposed substantially perpendicular to the axis of rotation;
    said first disc is rigidly connected to said second mass;
    said first mass comprises a second disc;
    said second disc is disposed substantially parallel to said first disc;
    said second disc is disposed a substantial axial distance from said first disc;
    said first disc and said second disc are configured and disposed to form a space for lubricant between said first disc and said second disc; and
    said space is configured and disposed to connect each of said plurality of passageways and said hollow space to permit lubricant to travel from each of said plurality of passageways through said space to said hollow space; and q) said second mass comprises a first disc and a second disc;

said first disc and said second disc are disposed substantially parallel to each another;

said first disc and said second disc are configured and disposed to form said hollow space;

said torsional vibration damper comprises a planetary gear train;

said planetary gear train is disposed between said first disc and said second disc;

said planetary gear train is configured and disposed to connect said coupling member to said second mass;
  said planetary gear train comprises:
    a ring gear;
    said ring gear comprising a portion of said coupling member;
    a sun gear;
    said sun gear comprising a portion of said hub;
    said sun gear comprising gearing;
    a plurality of planet wheels;
    said plurality of planet wheels being disposed between said ring gear and said sun gear;
    each of said plurality of planet wheels being configured and disposed to engage with said gearing of said sun gear;
    each of said plurality of planet wheels being mounted on both said first disc and said second disc; and
    each of said plurality of planet wheels being configured and disposed to rotate between said first disc and said second disc;

said two-mass flywheel comprises a ring channel;

said ring channel is disposed adjacent to said bearing arrangement;

each of said plurality of passageways comprises a first end and a second end;

said second end of each of said plurality of passageways is disposed opposite to said first end of each of said plurality of passageways;

said first end of each of said plurality of passageways comprises said orifice structure;

said second end of each of said plurality of passageways is disposed at least one of r), s) and t):
  r) on said outer surface of said hub between said bearing arrangement and at least one of said sun gear and said plurality of planet wheels;
  s) in said gearing of said sun gear; and
  t) in said ring channel;

each pair of adjacent planet wheels of said plurality of planet wheels is configured and disposed to form a space for lubricant between said each pair of adjacent planet wheels; and said space is configured and disposed to connect said second end of each of said plurality of passageways and said hollow space to permit lubricant to travel from said second end of each of said plurality of passageways through said space to said hollow space.

11. In a two-mass flywheel in a drive train of a motor vehicle having a torsional vibration damper, said motor vehicle drive train comprising:

a crankshaft;

said crankshaft being rotatable about an axis of rotation;

said crankshaft to be operatively connected to an engine of a motor vehicle;

a two-mass flywheel;

a transmission assembly;

said transmission assembly comprising:
  a pressure plate;
  said pressure plate being disposed adjacent to said two-mass flywheel;
  a clutch disc;
  said clutch disc being disposed between said pressure plate and said two-mass flywheel;
  a spring arrangement;
  said spring arrangement being disposed adjacent to said pressure plate;
  said spring arrangement being configured and disposed to move said pressure plate to operatively engage said clutch disc with said two-mass flywheel;
  a shaft;
  said shaft being rotatable about the axis of rotation; and
  said shaft to be operatively connected to a transmission of a motor vehicle;

said two-mass flywheel comprising:
  a first mass;
  said first mass being connected to said crankshaft;
  a second mass;
  said second mass being connected to said transmission assembly;
  said first mass and said second mass being connected to rotate together and relative to one another about the axis of rotation;
  one of said first mass and said second mass comprising a hub;
  said hub being disposed about the axis of rotation;
  at least one of said first mass and said second mass being configured to form a hollow space between said first mass and said second mass;
  at least one passageway;

at least a portion of said at least one passageway being disposed within one of said first mass and said second mass;

said at least one passageway being configured and disposed to permit lubricant to move through said at least one passageway into said hollow space;

said at least one passageway comprising an orifice structure;

said orifice structure being configured and disposed to receive lubricant;

a component to seal said orifice structure;

said component comprising an already existing component of said drive train, said component being one of the following a), b) and c):
  a) a portion of said crankshaft;
  b) a plate being disposed to operatively connect said hub to a first bearing arrangement; and
  c) a second bearing arrangement being disposed between said hub and said shaft to guide said two-mass flywheel on said shaft;

said component comprising a surface; and said surface of said component being disposed to contact said orifice structure to seal said orifice structure and to minimize leakage of lubricant from said two-mass flywheel; and said torsional vibration damper comprising:
  at least one spring;
  said at least one spring being disposed within said hollow space;
  said at least one spring being configured and disposed to connect said first mass and said second mass with rotational elasticity; and
  said lubricant being disposed in said hollow space and about said at least one spring to dampen vibrations.

12. The two-mass flywheel according to claim 11, wherein:

said torsional vibration damper comprises a coupling member;

at least a portion of said coupling member is disposed in said hollow space;

said coupling member is operatively connected to said second mass;

said at least one spring is configured and disposed to connect said first mass and said coupling member with rotational elasticity;

said first bearing arrangement is disposed on said hub;

said first bearing arrangement is configured and disposed to guide said second mass about the axis of rotation;

said hub is substantially ring-shaped; and said at least one passageway is at least one of d) and e):
  d) disposed adjacent to said hub; and
  e) disposed within said hub.

13. The two-mass flywheel according to claim 12, wherein:

said first mass is configured to form said hollow space between said first mass and said second mass;

said coupling member comprises a first disc;

said first disc is disposed substantially perpendicular to the axis of rotation;

said first disc is rigidly connected to said second mass;

said first mass comprises a second disc;

said second disc is disposed substantially parallel to said first disc;

said second disc is disposed a substantial axial distance from said first disc;

said first disc and said second disc are configured and disposed to form a space for lubricant between said first disc and said second disc; and said space is configured and disposed to connect said at least one passageway and said hollow space to permit lubricant to travel from said at least one passageway through said space to said hollow space.

14. The two-mass flywheel according to claim 13, wherein said two-mass flywheel comprises one of f), g) and h):

f) said component comprises said portion of said crankshaft;

said crankshaft comprises a flange portion;

said surface of said component is disposed on said flange portion of said crankshaft;

said first mass comprises a surface;

said surface of said first mass is disposed substantially perpendicular to the axis of rotation;

said orifice structure is disposed on said perpendicular surface of said first mass;

said at least one passageway comprises a plurality of passageways;

said plurality of passageways are disposed about the axis of rotation;

said portion of said crankshaft is configured and disposed to contact said hub;

said surface of said component is configured and disposed to simultaneously seal said orifice structure of each of said plurality of passageways;

said perpendicular surface of said first mass is configured to permit a mouthpiece of a lubricant press to form a pressure-tight seal on said perpendicular surface of said first mass;

said hub comprises at least a portion of said first mass;

said hub comprises an inner surface and an outer surface;

said inner surface of said hub is disposed a first radial distance from the axis of rotation;

said outer surface of said hub is disposed a second radial distance from the axis of rotation;

the second radial distance is substantially greater than the first radial distance;

said hub comprises an end surface;

said end surface of said hub is disposed substantially perpendicular to the axis of rotation between said inner surface of said hub and said outer surface of said hub;

said end surface of said hub comprises at least a portion of said perpendicular surface of said first mass;

each of said plurality of passageways comprises a radial slot;

said radial slot of each of said plurality of passageways is disposed to connect said outer surface of said hub and said end surface of said hub;

said radial slot of each of said plurality of passageways comprises a deflector surface;

said deflector surface of said radial slot of each of said plurality of passageways is configured and disposed to direct lubricant towards said hollow space;

said first bearing arrangement is disposed radially outside of said plurality of passageways;

said first mass is connected to said crankshaft by threaded bolts; and said second mass is connected to said shaft by a friction clutch;

g) said component comprises said plate to operatively connect said hub to said first bearing arrangement;
said second mass comprises a surface;
said surface of said second mass is disposed substantially perpendicular to the axis of rotation; and
said orifice structure is disposed on said perpendicular surface of said second mass;
said at least one passageway comprises a plurality of passageways;
said plurality of passageways are disposed about the axis of rotation;
said plate is configured and disposed to contact said hub;
said surface of said component is configured and disposed to simultaneously seal said orifice structure of each of said plurality of passageways;
said perpendicular surface of said second mass is configured to permit a mouthpiece of a lubricant press to form a pressure-tight seal on said perpendicular surface of said second mass;
said hub comprises an inner surface and an outer surface;
said inner surface of said hub is disposed a first radial distance from the axis of rotation;
said outer surface of said hub is disposed a second radial distance from the axis of rotation;
the second radial distance is substantially greater than the first radial distance;
said hub comprises an end surface;
said end surface of said hub is disposed substantially perpendicular to the axis of rotation between said inner surface of said hub and said outer surface of said hub;
said end surface of said hub comprises at least a portion of said perpendicular surface of said second mass;
each of said plurality of passageways comprises a radial slot;
said radial slot of each of said plurality of passageways is disposed to connect said outer surface of said hub and said end surface of said hub;
said radial slot of each of said plurality of passageways comprises a deflector surface;
said deflector surface of said radial slot of each of said plurality of passageways is configured and disposed to direct lubricant towards said hollow space;
said first bearing arrangement is disposed radially outside of said plurality of passageways;
said first mass is connected to said crankshaft by threaded bolts; and
said second mass is connected to said shaft by a friction clutch; and h) said component comprises said second bearing arrangement disposed between said hub and said shaft to guide said two-mass flywheel on said shaft;
said second bearing arrangement comprises a pivot bearing;
said pivot bearing is configured to be disposed inside said hub;
said hub comprises an inner surface and an outer surface;
said inner surface of said hub is disposed a first radial distance from the axis of rotation;
said outer surface of said hub is disposed a second radial distance from the axis of rotation;
the second radial distance is substantially greater than the first radial distance;
said orifice structure of said at least one passageway is disposed on said inner surface of said hub;
said at least one passageway comprises a plurality of passageways;
said plurality of passageways are disposed about the axis of rotation;
said outer surface of said pivot bearing is configured and disposed to simultaneously seal said orifice structure of each of said plurality of passageways;
said first bearing arrangement is disposed radially outward of said plurality of passageways;
said first mass is connected to said crankshaft by threaded bolts; and
said second mass is connected to said shaft by a friction clutch.

15. The two-mass flywheel according to claim 12, wherein:
said second mass comprises a first disc and a second disc;
said first disc and said second disc are disposed substantially parallel to each another;
said first disc and said second disc are configured and disposed to form said hollow space;
said torsional vibration damper comprises a planetary gear train;
said planetary gear train is disposed between said first disc and said second disc;
said planetary gear train is configured and disposed to connect said coupling member to said second mass; and
said planetary gear train comprises:
a ring gear;
said ring gear comprising a portion of said coupling member;
a sun gear;
said sun gear comprising-a portion of said hub;
said sun gear comprising gearing;
a plurality of planet wheels;
said plurality of planet wheels being disposed between said ring gear and said sun gear;
each of said plurality of planet wheels being configured and disposed to engage with said gearing of said sun gear;
each of said plurality of planet wheels being mounted on both said first disc and said second disc; and
each of said plurality of planet wheels being configured and disposed to rotate about the axis of rotation between said first disc and said second disc.

16. The two-mass flywheel according to claim 15, wherein said two-mass flywheel comprises one of i), j) and k):
i) said component comprises said portion of said crankshaft;
said crankshaft comprises a flange portion;
said surface of said component is disposed on said flange portion of said crankshaft;
said first mass comprises a surface;
said surface of said first mass is disposed substantially perpendicular to the axis of rotation;
said orifice structure is disposed on said perpendicular surface of said first mass;
said at least one passageway comprises a plurality of passageways;
said plurality of passageways are disposed about the axis of rotation;
said portion of said crankshaft is configured and disposed to contact said hub;
said surface of said component is configured and disposed to simultaneously seal said orifice structure of each of said plurality of passageways;

said perpendicular surface of said first mass is configured to permit a mouthpiece of a lubricant press to form a pressure-tight seal on said perpendicular surface of said first mass;

said hub comprises at least a portion of said first mass;

said hub comprises an inner surface and an outer surface;

said inner surface of said hub is disposed a first radial distance from the axis of rotation;

said outer surface of said hub is disposed a second radial distance from the axis of rotation;

the second radial distance is substantially greater than the first radial distance;

said hub comprises an end surface;

said end surface of said hub is disposed substantially perpendicular to the axis of rotation between said inner surface of said hub and said outer surface of said hub;

said end surface of said hub comprises at least a portion of said perpendicular surface of said first mass;

each of said plurality of passageways comprises a radial slot;

said radial slot of each of said plurality of passageways is disposed to connect said outer surface of said hub and said end surface of said hub;

said radial slot of each of said plurality of passageways comprises a deflector surface;

said deflector surface of said radial slot of each of said plurality of passageways is configured and disposed to direct lubricant towards said hollow space;

said first bearing arrangement is disposed radially outside of said plurality of passageways;

said first mass is connected to said crankshaft by threaded bolts; and said second mass is connected to said shaft by a friction clutch;

j) said component comprises said plate to operatively connect said hub to said first bearing arrangement;

said second mass comprises a surface;

said surface of said second mass is disposed substantially perpendicular to the axis of rotation; and said orifice structure is disposed on said perpendicular surface of said second mass;

said at least one passageway comprises a plurality of passageways;

said plurality of passageways are disposed about the axis of rotation;

said plate is configured and disposed to contact said hub;

said surface of said component is configured and disposed to simultaneously seal said orifice structure of each of said plurality of passageways;

said perpendicular surface of said second mass is configured to permit a mouthpiece of a lubricant press to form a pressure-tight seal on said perpendicular surface of said second mass;

said hub comprises an inner surface and an outer surface;

said inner surface of said hub is disposed a first radial distance from the axis of rotation;

said outer surface of said hub is disposed a second radial distance from the axis of rotation;

the second radial distance is substantially greater than the first radial distance;

said hub comprises an end surface;

said end surface of said hub is disposed substantially perpendicular to the axis of rotation between said inner surface of said hub and said outer surface of said hub;

said end surface of said hub comprises at least a portion of said perpendicular surface of said second mass;

each of said plurality of passageways comprises a radial slot;

said radial slot of each of said plurality of passageways is disposed to connect said outer surface of said hub and said end surface of said hub;

said radial slot of each of said plurality of passageways comprises a deflector surface;

said deflector surface of said radial slot of each of said plurality of passageways is configured and disposed to direct lubricant towards said hollow space;

said first bearing arrangement is disposed radially outside of said plurality of passageways;

said first mass is connected to said crankshaft by threaded bolts; and said second mass is connected to said shaft by a friction clutch; and k) said component comprises said second bearing arrangement disposed between said hub and said shaft to guide said two-mass flywheel on said shaft;

said second bearing arrangement comprises a pivot bearing;

said pivot bearing is configured to be disposed inside said hub;

said hub comprises an inner surface and an outer surface;

said inner surface of said hub is disposed a first radial distance from the axis of rotation;

said outer surface of said hub is disposed a second radial distance from the axis of rotation;

the second radial distance is substantially greater than the first radial distance;

said orifice structure of said at least one passageway is disposed on said inner surface of said hub;

said at least one passageway comprises a plurality of passageways;

said plurality of passageways are disposed about the axis of rotation;

said outer surface of said pivot bearing is configured and disposed to simultaneously seal said orifice structure of each of said plurality of passageways;

said first bearing arrangement is disposed radially outward of said plurality of passageways;

said first mass is connected to said crankshaft by threaded bolts; and said second mass is connected to said shaft by a friction clutch.

17. The two-mass flywheel according to claim 16, further comprising:

a ring channel;

said ring channel is disposed adjacent to said first bearing arrangement;

each of said plurality of passageways comprises a first end and a second end disposed opposite to said first end;

said first end of each of said plurality of passageways comprises said orifice structure;

said second end of each of said plurality of passageways is disposed at least one of l), m) and n):

l) on said outer surface of said hub between said bearing arrangement and at least one of said sun gear and said plurality of planet wheels;

m) in said gearing of said sun gear; and n) in said ring channel;

each pair of adjacent planet wheels of said plurality of planet wheels is configured and disposed to form a space for lubricant between said each pair of adjacent planet wheels; and said space is configured and disposed to connect said second end of each of said plurality of passageways and said hollow space to permit lubricant to travel from said second end of each of said plurality of passageways through said space to said hollow space.

18. A method of making a drive train with a two-mass flywheel having a torsional vibration damper, said drive train comprising: a crankshaft; said crankshaft being rotatable about an axis of rotation; said crankshaft to be operatively connected to an engine of a motor vehicle; a two-mass flywheel; a transmission assembly; said transmission assembly comprising: a pressure plate; said pressure plate being disposed adjacent to said two-mass flywheel; a clutch disc; said clutch disc being disposed between said pressure plate and said two-mass flywheel; a spring arrangement; said spring arrangement being disposed adjacent to said pressure plate; said spring arrangement being configured and disposed to move said pressure plate to operatively engage said clutch disc with said two-mass flywheel; a shaft; said shaft being rotatable about the axis of rotation; and said shaft to be operatively connected to a transmission of a motor vehicle; and said two-mass flywheel comprising: a first mass; said first mass being connected to said crankshaft; a second mass; said second mass being connected to said transmission assembly; said first mass and said second mass being connected to rotate together and relative to one another about the axis of rotation; one of said first mass and said second mass comprising a hub; said hub being disposed about the axis of rotation; at least one of said first mass and said second mass being configured to form a hollow space between said first mass and said second mass; at least a portion of said hollow space being disposed a substantial distance from the axis of rotation; said hollow space being configured to contain a lubricant; at least one passageway; at least a portion of said at least one passageway being disposed within one of said first mass and said second mass; said at least one passageway being configured and disposed to permit lubricant to move through said at least one passageway into said hollow space; said at least one passageway comprising an orifice structure; said orifice structure being configured and disposed to receive lubricant; a component to seal said orifice structure; said component comprising an already existing component of said drive train, said component being one of the following a), b) and c): a) a portion of said crankshaft; b) a plate being disposed to operatively connect said hub to a first bearing arrangement; and c) a second bearing arrangement being disposed between said hub and said shaft to guide said two-mass flywheel on said shaft; said component comprising a surface; and said surface of said component being disposed to contact said orifice structure to seal said orifice structure and to minimize leakage of lubricant from said two-mass flywheel;

said torsional vibration damper comprising: at least one spring;

said at least one spring being disposed within said hollow space;

said at least one spring being configured and disposed to connect said first mass and said second mass with rotational elasticity; and a lubricant disposed in said hollow space and about said at least one spring to dampen vibrations;

said method comprising the steps of:

providing a crankshaft for operatively connecting to a motor vehicle;

providing the two-mass flywheel with:
a first mass;
a second mass;
a hollow space;
at least one passageway; and
a component for sealing the at least one passageway;

providing one of the first mass and the second mass with a hub;

providing the at least one passageway with an orifice structure;

providing the component with an already existing component of said drive train, the component being one of the following a), b) and c):
a) a portion of said crankshaft;
b) a plate for connecting the hub to a first bearing arrangement; and
c) a second bearing arrangement;

said method further comprising the steps of:

positioning a lubricant press on the orifice structure;

obtaining a pressure-tight seal between the lubricant press and the orifice structure;

inserting the lubricant into the orifice structure through the lubricant press;

moving the lubricant to the hollow space through the at least one passageway;

positioning the component to cover the orifice structure of said at least one passageway;

connecting the first mass to the crankshaft;

connecting the second mass to the transmission assembly; and positioning said component over said orifice structure for sealing said orifice structure and minimizing the leakage of lubricant from said two-mass flywheel.

* * * * *

UNITED STATES PATENT AND TRADEMARK OFFICE
CERTIFICATE OF CORRECTION

PATENT NO.  : 5,944,610
DATED       : August 31, 1999
INVENTOR(S) : Jörg SUDAU

It is certified that error appears in the above-identified patent and that said Letters Patent is hereby corrected as shown below:

In column 4, line 52, after 'numeral', delete "21)" and insert --2)--.

In column 15, line 33, Claim 6, after 'claim' insert --5--.

In column 17, line 22, Claim 8, after 'and', delete"1): " and insert --1):--.

Signed and Sealed this

Eighteenth Day of July, 2000

Attest:

Q. TODD DICKINSON

*Attesting Officer*     *Director of Patents and Trademarks*